May 3, 1960 G. H. BENDIX ET AL 2,935,680
MEANS OF GAUGING SHEET METAL AND THE LIKE
Filed Sept. 10, 1953
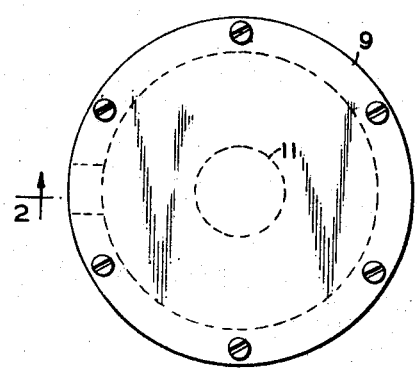
INVENTORS
GORDON H. BENDIX
RICHARD F. TAMM
ATTORNEYS United States Patent Office 2,935,680
Patented May 3, 1960

2,935,680

MEANS OF GAUGING SHEET METAL AND THE LIKE

Gordon H. Bendix, Park Ridge, and Richard F. Tamm, Chicago, Ill., assignors to Continental Can Company, Inc., New York, N.Y., a corporation of New York Application September 10, 1953, Serial No. 379,434

2 Claims. (Cl. 324—34)

This invention relates to an improved method and device for the measurement of the thickness of magnetizable sheet material such as steel or iron, and particularly tin plated sheets and strips. It serves to indicate material which is heavier or thicker than a predetermined upper limit of tolerance, and also material lighter or thinner than a predetermined lower limit of tolerance or indicate actual thickness of the sheet on an electrical meter.

The control of the weight or thickness of plate is important to fabricators of sheet metal of the type used in the metal container industry. Sheets are supplied from the mill with rather wide tolerances. In the tin plate industry, a base box is defined as that quantity having an area equivalent to 112 sheets 20" x 14" or 31360 sq. inches. The gauge of thickness is indicated by the weight per base box. For example, if a base box of these sheets weighs 90 pounds, they would be known to average 0.010" in thickness. Considerable variation from the average or normal thickness exists due to mechanical limitations in rolling the sheets or strip. According to tolerances existing in the industry variations from the nominal weight may be as much as ±2½% on large lots and as much as ±10% on individual sheets.

However, in the fabrication of sheet metal ware, such as metal containers commonly known as "tin cans," high speed machines and particularly dies, are necessarily adjusted for power demands and with clearances suitable to a relatively narrow range of sheet thickness. If fed with sheets above this range, that is too thick, the machinery jams, and the dies are frequently damaged or broken.

Sheets which are less than the allowable minimum thickness produce unsatisfactory results due to inadequate strength and other defects.

It is therefore of prime importance to gauge the individual sheets before feeding them to the container-making machinery and to assure that only those sheets are fed which come within the permissible limits of thickness. It has been proposed to use magnetism as an index of the thickness of the sheets. Merely measuring the amount of magnetism that may be imparted to a given sheet, and thus deducing the thickness, is subject to error due to differences in chemical composition, hardness, grain size, grain direction and the area of the sample being tested.

It is an object of the present invention to provide a device and a method by which the thickness of plate or its weight per base box may be easily and accurately indicated in terms of the current flowing through a conventional electric meter.

It is a further object of the present invention to provide a method and an electronic apparatus which is unresponsive to material within an acceptable range in thickness or base weight, but which will indicate material either below or above the acceptable tolerance range.

A still further object of our invention is to provide a gauging head with a magnetic circuit energized by alternating current, the impedance to the flow of said current being caused to vary mainly with the thickness of the magnetizable sheet being measured.

A still further object of the invention is to provide such gauging heads as will magnetically saturate the area of material being tested during a part of each alternating current half cycle, either of standard thickness or where the thickness is more or less than the range of tolerance permitted.

Furthermore, an object of the invention is to provide a device which will operate satisfactorily to indicate the thickness of the sheet being tested, regardless of variations in chemical composition, hardness, grain size and grain direction.

Among the objects of the invention is the design of a device which will operate electrically to determine the thickness of magnetizable sheets or strip as compared with a standard sheet of selected thickness and to thus indicate whether the sheet being tested is within the acceptable predetermined tolerance of rolling mill practice, or alternatively is too thick or too thin for ready employment in fabricating operations.

Other objects of the invention will be readily understood from the following description of the preferred form of the invention as illustrated in the accompanying drawings in which:

Figure 1 is a top plan view of the novel device for magnetically gauging sheet metal;

Figure 2 is a vertical section on the line 2—2 of Figure 1, and

Figure 3 is a schematic diagram of suitable electric circuits for use in carrying out the method.

The problem dealt with in this invention consists in electrically gauging a sheet of steel, iron or other magnetically permeable material 5, and comparing the same with a standard sheet 6.

This purpose is accomplished by providing a gauging device 7 which includes a housing 8 of magnetic material such as iron or steel. This housing has a cover plate 9, also of magnetic material, preferably mild steel. The housing 8 has a circular pole piece 10 forming part of the bottom. A central pole piece 11 forms part of the cover plate and depends axially through the housing into the plane of the pole piece 10. The coil 12 of an electromagnet is mounted within the housing and around the central pole piece 11. Conductors 13, 14 connect this coil 12 with the source of an alternating current.

It is characteristic of this arrangement that the housing 8 and cover plate 9 together with the pole pieces 10 and 11 form a magnetic path of considerably less magnetic reluctance than the magnetic path provided by the relatively thin sheet 5 which it is intended to test.

When a sheet to be measured is placed across the open end of the annular housing 8 and an alternating voltage is applied to the coil 12, an alternating magnetic flux is induced in the magnetic path consisting of the housing 8, the cover plate 9, the pole pieces 10 and 11 and the annular area of the sample 5 or standard 6 which lies between pole piece 10 and pole piece 11. The alternating current is regulated to magnetically saturate the metal in the sample 5 to be gauged during a part of each one-half cycle without, however, increasing the current to such a flux density that the housing 8, cover plate 9, and the pole pieces 10 and 11 will become magnetically saturated.

Since the sample sheet 5 is relatively small in cross sectional area as compared to any other cross sectional area of the magnetic circuit, comprising the housing 8, cover plate 9, and pole pieces 10 and 11, the sample 5 will be the controlling element in establishing the maximum magnetic flux which can be sustained in the magnetic circuit. The magnetic flux in the magnetic circuit is induced by the alternating current in coil 12. It, therefore, also alternates in magnitude and direction at a frequency corresponding to the voltage impressed across coil 12. It follows that, if sample 5 is sufficiently thin, during each half cycle of alternating current and alternating magnetic flux, there will be an instant of time during the period of increasing current (and increasing magnetic flux) at which the magnetic flux induced by the current in coil 12 will be just sufficient to attain magnetic saturation in sample 5. Since the magnitude of the flux through sample 5 at saturation depends upon the cross sectional area of sample 5, it follows that the instant of time at which saturation occurs during each half cycle depends on the thickness of sample 5, and it is also clear that during each half cycle, magnetic saturation of sample 5 will occur at progressively later instants of time if the thickness of sample 5 is made progressively thicker. Expressed in other words, it is clear that sample 5 will be magnetically saturated during a certain fraction of each half cycle and that an increase in the thickness of sample 5 will decrease the fractional portion of each half cycle during which the current in coil 12 is of sufficient magnitude to induce magnetic saturation in sample 5.

A measurement of the fraction of each half cycle during which magnetic saturation prevails when an alternating voltage is impelling an alternating current through coil 12 will, therefore, be a measure of the thickness of sample 5.

Other electrical phenomena such as a decrease in the impedance of coil 12 and an attendant increase in the current flowing at a specified voltage also prevail during each repetitive brief period of magnetic saturation. Accordingly, the average impedance of coil 12 or the average current flowing in coil 12 can be used as a measure of the thickness of sample 5 because either of these average values is dependent upon the fractional portion of each half cycle during which magnetic saturation exists. Also, the change in average impedance of coil 12 or the change in the average current in coil 12 upon substituting a reference sample 6 for an unknown sample 5 will be a measure of the difference in thickness between samples 5 and 6.

In the operation of comparing sheets to be measured to a standard base weight sheet thickness, two gauging heads are employed. Across the poles of one head is a sheet of known thickness as for example the thickness corresponding to the average designated base weight sheet in a mill shipment of sheets to a fabricator. Thus the average impedance in the coil of this stationary head is constant. Across the poles of the second or portable head is placed the sheet to be compared to the standard sample. The average impedance of the coil in the portable head differs from the average impedance of the coil in the stationary head by an amount depending on the difference in thickness.

Any suitable indicator may be provided in the circuit containing the conductors 28 and 30 and thus the impedance factor and the thickness of the sheet registered.

The ready comparison of the test sheet with a standard is effected by the use of a standard sheet operatively associated with a second identical gauging device. This second gauging device need not however be part of or closely connected with the gauging device 7. It may be fixedly mounted while the device 7 is portable and manually applied to the sheets being tested.

As typifying such a system of comparison, reference is made to the circuit diagram shown in Figure 3. Here the conductors 13 and 14 are parts of an input circuit 15 of alternating current, such as 115 volts. The transformer 16 changes the voltage to a suitable value.

Current passes through the coil 1 and the identical coil 17 of the second or reference gauging device 18, the coils having an intermediate connection 19. The conductor 14 includes a switch device 20 biased to open position.

The reference gauging device 18 is associated with a standard sheet 6 to which the sample 5 is to be compared.

The conductors 13 and 14 have branches 21 and 22 respectively which are connected by individual resistances 23 and 24 respectively and a common variable resistance 25.

The mid-point 19 has a conductor 26 passing to a switch 27 and by conductor 28 and the winding 29 of transformer 31 thence to the variable resistance 25 by conductor 30.

When the switches 20 and 27 are closed the bridge can be adjusted so that no current will flow in the primary winding of transformer 31. To make this adjustment, the tested sheet 5 will be selected to have the same thickness as standard or reference sheet 6 and the potentiometer 25 adjusted so that no current flows in the primary 29 of the transformer 31.

The output 32 of transformer 31 is connected in any suitable indicating circuit such as a voltmeter or amplifier and indicator. The magnitude of the current flow in the circuits 28, 30 and 32 is a measure of the difference in impedance between coil 12 and coil 17 and therefore also a measurement of the difference in thickness between samples 5 and 6. The phase of the current flowing in the secondary of transformer 31 will indicate whether this difference should be added to or subtracted from the weight of the reference sample in order to obtain the weight of the unknown sample.

The switches 20 and 27 are parts of a double-pole single throw relay 33 in an independent circuit 34. A suitable circuit closer 35, manually operated, is in this circuit. Thus the operator may simultaneously close the circuits 13, 14 and 21, 28 to obtain a comparative indication of the tested sheet 5 and the reference sheet 6.

In Figure 2, the critical range of the current flow through the coil of the test head will be governed by the concentric arrangement of the magnet poles which minimize stray magnet fields and limit the variable factor to that of thickness, independent of composition of the sheet or its physical characteristics such as grain.

By the methods above described the current which flows through the coil will be modified by the impedance of the coil. Since only the sheet is ever in a condition of saturation, the variable factor in the impedance will be the magnetic condition of the sheet being tested. As the magnetic flux through the sheet is brought to a condition of saturation, the impedance of the coil drops rapidly and any indicator in the electrical circuit will therefore respond directly to the condition prevailing in the magnetic path of the sheet. Here again the critical factor is the thickness of the sheet which determines the current flow in the coil.

The means by which the above method is carried out in a practical manner has been illustrated and described by way of example. This, however, does not limit the extent to which the device may be varied in material and proportions within the scope of the appended claims.

What we claim is:

1. A device for gauging the thickness of sheets of magnetizable metal comprising two equivalent electromagnets each having a central core and a surrounding pole, a coil on each core, a common alternating current source for said coils, said source being sufficient to cause the material under test to be magnetically saturated by the electromagnets during at least a portion of the alternating current cycle, the core and pole of one magnet being bridged by a reference sheet of metal, a circuit closer in the circuit of the source, the core and pole of the second magnet being bridged by a sheet of metal to be tested, branch resistance circuits connected to the alternating source on opposite sides of the coils, an adjustable resistance unit connected to said resistance circuits, said adjustable unit being connected to the alternating current source intermediate the coils and indicating means in series with said adjustable unit.

2. A device for gauging the thickness of sheets of magnetizable metal comprising two equivalent electromagnets each having a central core and a surrounding pole, a coil on each core, a common alternating current source for the coils in series, said source being sufficient to cause the material under test to be magnetically saturated by the electromagnets during at least a portion of the alternating current cycle, the core and pole of one magnet being bridged by a reference sheet of metal, a circuit closer in the circuit of the source, the core and pole of the second magnet being bridged by a sheet of metal to be tested, branch resistance circuits connected to the alternating current source on opposite ends of the coils, an adjustable resistance unit connected to said resistance circuits said adjustable unit having a connection to the alternating current source intermediate the coils, current indicating means in series with said adjustable unit and simultaneously operating circuit closers for the circuit of said alternating current source and said adjustable unit connection.

References Cited in the file of this patent

UNITED STATES PATENTS

| | | | |
|---|---|---|---|
| 2,111,210 | Ebel | Mar. 15, | 19: |
| 2,116,119 | Loewenstein | May 3, | 19: |
| 2,124,577 | Knerr | July 26, | 19: |
| 2,226,275 | Abbott et al. | Dec. 24, | 19. |
| 2,357,666 | Kuehni | Sept. 5, | 19. |
| 2,412,046 | Hoare | Dec. 3, | 19. |
| 2,481,345 | Reynst | Sept. 6, | 19. |
| 2,534,420 | Delaney | Dec. 19, | 19: |
| 2,537,731 | Angell | Jan. 9, | 19: |
| 2,595,380 | Hudson | May 6, | 19: |
| 2,700,132 | Kuehne | Jan. 18, | 19: |

FOREIGN PATENTS

| | | | |
|---|---|---|---|
| 368,006 | Great Britain | Mar. 3, | 19: |